(12) United States Patent
Yoon et al.

(10) Patent No.: US 12,044,010 B2
(45) Date of Patent: Jul. 23, 2024

(54) REBAR MOVEMENT-PREVENTION-TYPE ONE-TOUCH COUPLER

(71) Applicant: WELLSYSMETAL CO., LTD., Busan (KR)

(72) Inventors: Myeong Shik Yoon, Busan (KR); Chul Sung Lee, Gimhae-si (KR)

(73) Assignee: WELLSYSMETAL CO., LTD., Busan (KR)

( * ) Notice: Subject to any disclaimer, the term of this patent is extended or adjusted under 35 U.S.C. 154(b) by 405 days.

(21) Appl. No.: 17/614,453

(22) PCT Filed: Jun. 10, 2019

(86) PCT No.: PCT/KR2019/006917
§ 371 (c)(1),
(2) Date: Nov. 26, 2021

(87) PCT Pub. No.: WO2020/241957
PCT Pub. Date: Dec. 3, 2020

(65) Prior Publication Data
US 2022/0235550 A1   Jul. 28, 2022

(30) Foreign Application Priority Data
May 29, 2019  (KR) .......... 10-2019-0063060

(51) Int. Cl.
*E04C 5/16* (2006.01)
*F16B 7/04* (2006.01)

(52) U.S. Cl.
CPC ............ *E04C 5/165* (2013.01); *F16B 7/0406* (2013.01); *Y10T 403/5733* (2015.01); *Y10T 403/5793* (2015.01)

(58) Field of Classification Search
CPC ......... Y10T 403/5733; Y10T 403/5793; E04C 5/165
See application file for complete search history.

(56) References Cited

U.S. PATENT DOCUMENTS 4,764,071 A * 8/1988 Lawrence ........... F16B 37/0864
411/433

FOREIGN PATENT DOCUMENTS

| CN | 108756075 A | 11/2018 | |
|---|---|---|---|
| JP | 3-72142 | * 3/1991 | ............... E04C 5/02 |
| KR | 20-0341839 Y1 | 2/2004 | |
| KR | 10-0443594 B1 | 8/2004 | |
| KR | 10-2009-0009578 A | 1/2009 | |
| KR | 10-2013-0143331 A | 12/2013 | |
| KR | 10-1654145 | * 8/2016 | ............. E04C 5/165 |

(Continued)

OTHER PUBLICATIONS

International Search Report for PCT/KR2019/006917 mailed Feb. 28, 2020 from Korean Intellectual Property Office.

*Primary Examiner* — Michael P Ferguson
(74) *Attorney, Agent, or Firm* — Paratus Law Group, PLLC

(57) ABSTRACT

A rebar movement-prevention-type one-touch coupler is configured to allow rebars to be fixed without a movement of the rebars after performing a one-touch insertion. A fixation of the rebars is completed by performing an additional tightening operation to housing units into which the rebars are inserted. The coupler increases both the fixation stability of the rebar and the safety of a structure employing the rebar.

3 Claims, 6 Drawing Sheets

(56) References Cited

FOREIGN PATENT DOCUMENTS

| KR | 10-1856706 | * | 5/2018 | ............. | E04C 5/165 |
| KR | 10-1951882 B1 | | 2/2019 | | |
| KR | 10-2019-0054371 A | | 5/2019 | | |
| WO | WO 2014/123298 | * | 4/2014 | ............. | E04C 5/165 |
| WO | WO 2019/078628 | * | 4/2019 | ............. | E04C 5/165 |

* cited by examiner (a)

(b)

(a)

(b)

REBAR MOVEMENT-PREVENTION-TYPE ONE-TOUCH COUPLER

CROSS-REFERENCE TO PRIOR APPLICATIONS

This application is a National Stage Patent Application of PCT International Patent Application No. PCT/KR2019/006917 (filed on Jun. 10, 2019) under 35 U.S.C. § 371, which claims priority to Korean Patent Application No. 10-2019-0063060 (filed on May 29, 2019), which are all hereby incorporated by reference in their entirety.

BACKGROUND

The present disclosure relates to a rebar movement-prevention-type one-touch coupler. More particularly, the present disclosure relates to a rebar movement-prevention-type one-touch coupler that is configured to allow rebars to be fixed without a movement of the rebars after performing a one-touch insertion, due to a structure configured such that a fixation of the rebars is completed by performing an additional tightening operation to housing units into which the rebars are inserted, so that the coupler increases both the fixation stability of the rebar and the safety of a structure employing the rebar.

Generally, a rebar is widely used to reinforce strength of a concrete structure with being embedded in concrete when a reinforced concrete structure is applied in the fields of construction or civil engineering. Particularly, a large number of the rebars are used for a large structure, a special structure, and a civil engineering structure such as a bridge.

However, since the rebar is standardized and manufactured in a uniform length, the rebar manufactured in a limited length is required to be connected to another rebar when the rebar is used for a large structure, a special structure, and a civil engineering structure such as a bridge.

Conventionally, a lap joint, a welding joint, a thread process joint, a mechanical joint, a one-touch joint, and so on have been used until now as a method of connecting a rebar.

As the lap joint is a method in which the rebars are overlapped each other to a predetermined length and joined by bundling them with steel wires or wires, the lap joint has a disadvantage in that since the rebars need to be overlapped and joined each other every time when the lap joint is performed, loss amount of the rebar is high, a strength of the overlapping portion is weak and easily separated, and a construction period is extended due to poor constructability. Further, the welding joint is inconvenient to be performed in construction, and the strength of the rebar around the welded portion is remarkably weakened since heat is applied to the welded portion.

The mechanical joint method has been developed to compensate for the disadvantages that are described above. However, as an example of the conventional mechanical joint method, referring to a connecting apparatus for a steel reinforcement disclosed in Korean Patent Application Publication No. 10-2009-0009578, a lot of manual operations of a technician such as contacting a first coupler and a second coupler to each other, tightening a tightening nut, inserting a fastening pin, and so on are required to be performed when rebars are connected to each other at a work site. Therefore, there have been problems that construction takes much time and has high cost.

In addition, a reinforcing bar coupler has been disclosed in Korean Patent Application Publication No. 10-2013-0143331. The disclosed reinforcing bar coupler includes: a sleeve having an inner portion thereof provided with a hollow portion communicating with an end portion in a longitudinal direction such that a reinforcing bar is inserted into the hollow portion through the end portion, and the sleeve being configured such that an outer circumferential surface thereof is provided with at least one opening portion that exposes the hollow portion; and a binding member having an inner side surface thereof provided with a plurality of joint grooves so that a joint of the reinforcing bar is fitted to the plurality of joint grooves, the binding member being interposed between an inner circumferential surface of the sleeve and an outer circumferential surface of the rebar that is inserted into the hollow portion of the sleeve.

However, in a conventional one-touch joint reinforcing bar coupler, since a holding force of a reinforcing bar is realized by a binding member, the holding force is relatively weak. Therefore, there has been a problem that a situation in which an initial slight movement occurs or the amount of a slipping of the reinforcing bar increases.

In order to solve this problem, it has been disclosed in Korean Patent No. 10-1951882 that a supporting member is mounted at a center portion of a one-touch reinforcing bar coupler such that a connection portion of a reinforcing bar is capable of being prevented from being located on one side. However, there has been a problem that it is difficult for a worker to estimate a length inserted into opposite sides of a coupler body when different reinforcing bars are connected to each other.

SUMMARY

Accordingly, the present disclosure has been made keeping in mind the above problems occurring in the related art, and the present disclosure is intended to propose a rebar movement-prevention-type one-touch coupler in a new type in which a structure is provided, the structure being configured such that rebars are inserted therein while a pair of housing units connected to a connection socket is in a state of being spaced apart from each other, and such that a fixation of the rebars is completed by performing an additional tightening operation to each of the housing units, thereby realizing the fixation of the rebars without allowing a movement of the rebars.

In addition, the present disclosure is intended to propose a rebar movement-prevention-type one-touch coupler in a new type in which a piece body ring having a rectangular vertical cross-section is provided and to which a plurality of piece bodies are fitted, thereby being capable of allowing the plurality of piece bodies to be stably and easily inserted inside the housing units while the plurality of piece bodies is positioned in place on a circular line and is prevented from being separated toward the outside, and thereby being capable of allowing the plurality of piece bodies to be disposed inside the housing units while maintaining the same height so that the rebars are securely fixed without an misoperation.

In addition, the present disclosure is intended to allow estimating of the coupling lengths between the pair of housing units and opposite sides of the connection socket when a worker connects the rebars to each other, by forming a non-thread machined surface on the center of the connection socket that is coupled to each of the housing units.

In addition, the present disclosure is intended to maximize the operational effect of a secure fixation structure of the rebars without a movement of the rebars, which is realized by double-tightening each of the housing units performed by the additional tightening operation of the worker and a finial tightening operation by using a separate tightening device after an initial setting mode for connecting the housing units to each other in a state of being spaced apart, thereby allowing the final tightening operation to be performed by using the separate tightening device such as a wrench since one side of the outer circumferential surface of each of the housing units is provided with a coupling guide surface having a polygonal shape.

In order to achieve the above objectives, according to one aspect of the present disclosure, there is provided a rebar movement-prevention-type one-touch coupler including: a pair of housing units each of which is formed in a tubular shape in which a rebar inlet hole provided at one side thereof and a socket mounting hole provided at the other side thereof are connected with each other via an inner passage, the pair of housing units being configured to have both a tapered inner circumferential surface of which an inner diameter becomes smaller in a side direction and a non-tapered inner circumferential surface, the non-tapered inner circumferential surface being configured such that a diameter thereof has the same diameter as a diameter of the socket mounting hole and being connected to the socket mounting hole; a pair of piece body units each of which is provided with a plurality of piece bodies that is inserted into and disposed in the inner passage while the plurality of piece bodies is in a state of being spaced apart from each other in a circular line, with a plurality of locking protrusions formed on an inner side surface of each of the plurality of piece bodies in a longitudinal direction thereof; a pair of springs each of which is configured to respectively provide an elastic force in a longitudinal direction thereof to each of the piece body units by being inserted into the inner passage of each of the housing units and by being fitted to a second end of each of the piece body units; and a connection socket formed in a cylindrical shape and disposed between the pair of housing units, the connection socket being configured to connect the pair of housing units to each other by being coupled to the opposed non-tapered inner circumferential surfaces of the housing units, and the connection socket being in close contact with and fixed to the pair of springs, wherein the rebar movement-prevention-type one-touch coupler is configured to be operated in an initial setting mode in which each of the housing units is in a state of being spaced apart from each other by an initial coupling length in which the pair of housing units are partially coupled to the connection socket, and is configured to be operated in a rebar fixing mode in which each of the housing units is coupled to the connection socket up to an additional coupling length while a rebar is in a state of being inserted into the inner passage through the rebar inlet hole, so that the rebar is fixed without a movement of the rebar while each of the springs and each of the piece bodies are guided to be moved to the side direction.

According to the rebar movement-prevention-type one-touch coupler of the present disclosure, the rebar movement-prevention-type one-touch coupler may further include a piece body ring configured to guide the plurality of piece bodies constituting each of the piece body units to be positioned in place on the circular line, and the inner side surface of each of the piece bodies may be provided with a piece body ring insertion groove having a predetermined height in a circumferential direction, so that the plurality of piece bodies may be inserted into and disposed in the inner passage of each of the housing units while maintaining the same height by the piece body ring that is fitted to the piece body ring insertion groove.

According to the rebar movement-prevention-type one-touch coupler of the present disclosure, the piece body ring may be formed of an elastic material and may be formed in a major arc shape that is provided with an n incision portion in which a predetermined section is cut, and the plurality of piece bodies inserted into the inner passage of each of the housing units may be in close contact with the tapered inner circumferential surface.

According to the rebar movement-prevention-type one-touch coupler of the present disclosure, each of the housing units may further include: a female thread machined surface that is formed at the non-tapered inner circumferential surface, and the connection socket may further include: male thread machined surfaces formed at opposite ends of an outer circumferential surface of the connection socket, respectively, so that each of the male thread machined surfaces is coupled to each of the female thread machined surfaces; and a non-thread machined surface recessively formed between the male thread machined surfaces and positioned at a center of an outer circumferential surface of each of the housing units.

According to the rebar movement-prevention-type one-touch coupler of the present disclosure, each of the housing units may further include: a coupling guide surface in which one side of an outer circumferential surface thereof is formed in a polygonal shape.

According to the rebar movement-prevention-type one-touch coupler of the present disclosure, the rebars are inserted into the pair of housing units while the pair of housing units coupled to the connection socket is in a state of being spaced apart, and the fixation of the rebars is completed by performing the additional tightening operation to the pair of housing units, so that the secure fixation of the rebars without movement of the rebars may be realized.

In addition, according to the rebar movement-prevention-type one-touch coupler of the present disclosure, the plurality of piece bodies is positioned in place on the circular line since the plurality of piece bodies is fitted to the piece body ring having the rectangular vertical cross-sectional shape, and the plurality of piece bodies is stably and easily inserted into each of the housing units without being separated to the outside and is disposed inside each of the housing units while maintaining the same height continuously, so that each of the piece bodies is capable of securely fixing the rebars without misoperation.

In addition, according to the rebar movement-prevention-type one-touch coupler of the present disclosure, since the non-thread machined surface is formed at the center of the connection socket that is coupled to each of the housing units, the worker is capable of estimating a coupling length between each of the housing units and opposite ends of the connection socket when the worker is connecting the rebars, and a working situation is capable of being easily checked at a glance.

In addition, according to the rebar movement-prevention-type one-touch coupler of the present disclosure, since the coupling guide surface having a polygonal shape that is capable of being inserted into the tightening device (wrench) is formed at the one side of the outer circumferential surface of each of the housing units in a longitudinal direction, each of the housing units is capable of being double-tightened by the additional tightening operation of the worker and the finial tightening operation by using a separate tightening device after performing the initial setting mode for connecting each of the housing units to each other with being spaced apart, so that the operational effect of the secure fixation structure of the rebars without movements of the rebars may be maximized.

DETAILED DESCRIPTION

Figure 1:
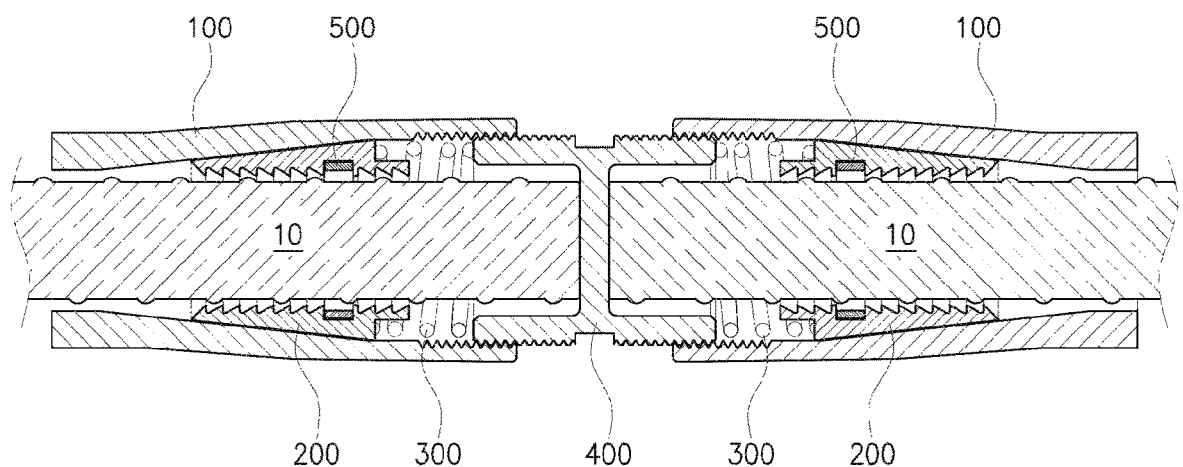
FIG. 1 is a view illustrating an initial setting mode of a rebar movement-prevention-type one-touch coupler according to an embodiment of the present disclosure.

Hereinafter, an embodiment of the present disclosure will be described in detail with reference to FIGS. 1 to 10 in the accompanying drawings. Meanwhile, in the drawings and the detailed description, illustration and explanation of the construction and operation of a general one-touch coupler which a person skilled in the art can easily understand will be simplified or omitted. Particularly, in the illustration of the drawings and the detailed description, illustration and description on the detailed technical construction and operation of elements, which have not direct relevance with the technical features of the present disclosure, will be omitted, and only the technical constructions related with the present disclosure will be briefly illustrated or explained.

Figure 2:
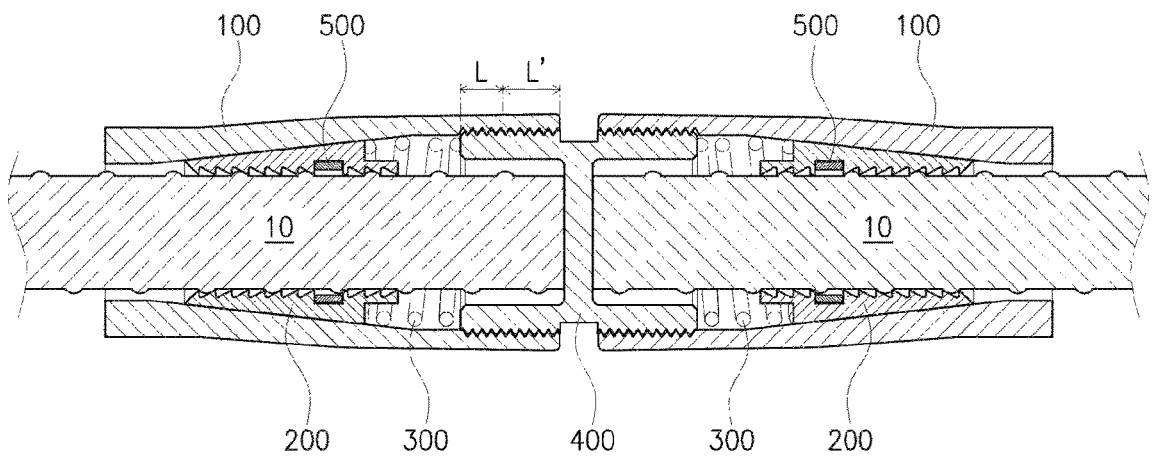
FIG. 2 is a view illustrating a rebar fixing mode of the rebar movement-prevention-type one-touch coupler according to an embodiment of the present disclosure.
Figure 3:
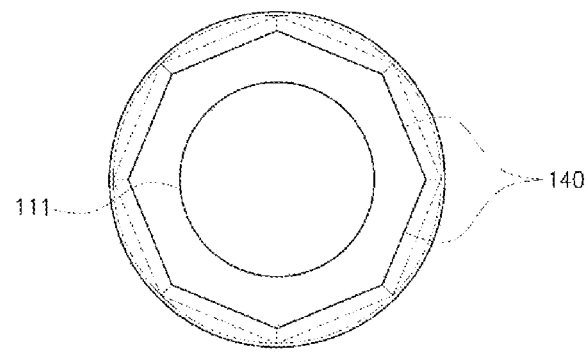
FIG. 3 shows external views illustrating a housing unit of the rebar movement-prevention-type one-touch coupler according to an embodiment of the present disclosure.
Figure 3:
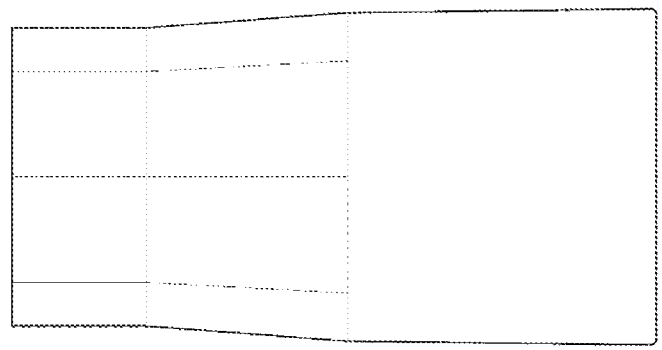
Figure 4:
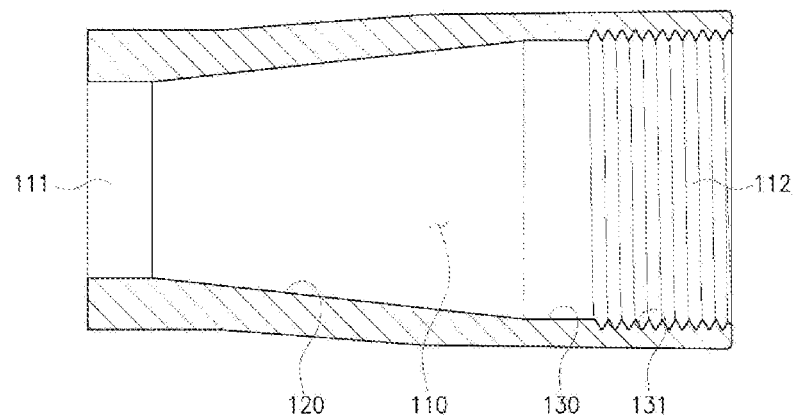
FIG. 4 is an internal cross-sectional view illustrating the housing unit of the rebar movement-prevention-type one-touch coupler according to an embodiment of the present disclosure.

Referring to FIGS. 1 and 2, a rebar movement-prevention-type one-touch coupler 1 according to an embodiment of the present disclosure is a device configured to connect rebars 10 to each other, and includes a housing unit 100, a piece body unit 200, a spring 300, a connection socket 400, and a piece body ring 500.

A pair of housing units 100 is arranged symmetrically on a straight line so that the rebars 10 can be connected to each other. One side of the housing unit 100 is provided with a rebar inlet hole 111, and the other side of the housing unit 100 is provided with a socket mounting hole 112. Therefore, it is preferable that the rebar inlet hole 111 of the housing unit 100 is configured to be larger than an outer diameter of the rebar 10 so that the rebar 10 is capable of being inserted into the rebar inlet hole 111 from an outside. Such a housing unit 100 is formed in a tubular shape, so that the rebar inlet hole 111 and the socket mounting hole 112 are connected with each other via an inner passage 110 of the housing unit 100.

In particular, the housing unit 100 has a tapered inner circumferential surface 120 of which an inner diameter becomes smaller toward the rebar inlet hole 111 that is positioned at the one side of the housing unit 100. In addition, a non-tapered inner circumferential surface 130 of which a diameter is the same as a diameter of the socket mounting hole 112 is provided at the other side of the housing unit 100. Such a non-tapered inner circumferential surface 130 may be provided with a female thread machined surface 131 so that the non-tapered inner circumferential surface 130 is coupled to the connection socket 400, and it is preferable that a male thread machined surface 431 is formed at an outer circumferential surface of the connection socket 400. In addition, at the non-tapered inner circumferential surface 130 of the housing unit 100, the fastening distance can be limited by forming the female thread machined surface 131 only at a section to which the connection socket 400 is coupled.

In addition, a coupling guide surface 140 formed in a polygonal shape may be formed at one side of an outer circumferential surface of the housing unit 100. When the pair of housing units 100 is coupled to the connection socket 400, the pair of housing units 100 may be securely fastened to the connection socket 400 by using a device such as a wrench or a monkey spanner since the coupling guide surface 140 is respectively formed at an end of the pair of housing units 100. Therefore, it is preferable that the one side of the outer circumferential surface of the housing unit 100 is formed in a hexagonal shape or an octagonal shape in a longitudinal direction, so that a slipping situation that may occur during a fastening operation may be prevented by a structure that has the coupling guide surface 140. In addition, a safety guide surface formed in a planar shape or a curved shape may be provided at an edge of the coupling guide surface 140. Such a safety guide surface prevents a worker from being injured from the sharp edge of the coupling guide surface 140 when the worker performs to couple the housing unit 100 to the connection socket 400.

Figure 5:
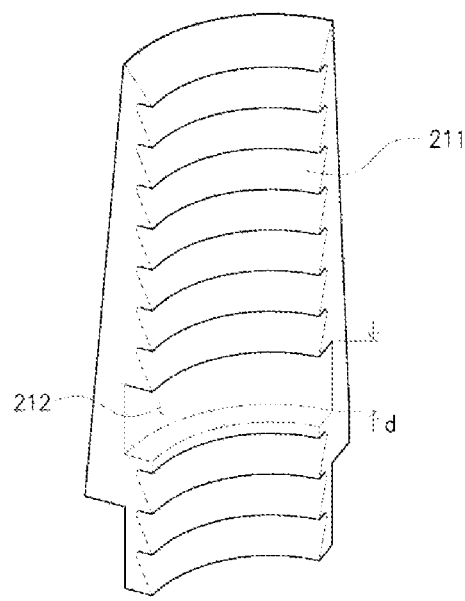
FIG. 5 is a perspective view illustrating a piece body of the rebar movement-prevention-type one-touch coupler according to an embodiment of the present disclosure.
Figure 6:
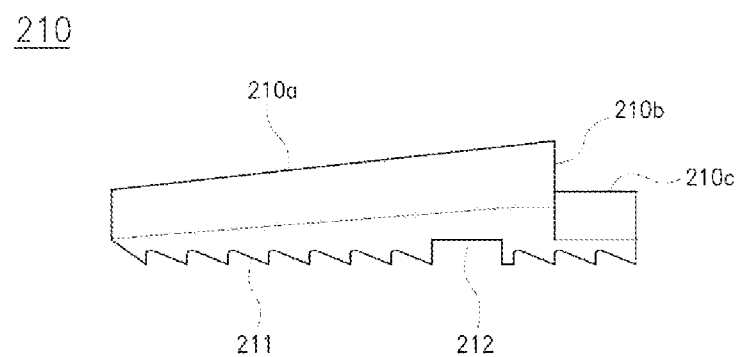
FIG. 6 is a side view illustrating the piece body of the rebar movement-prevention-type one-touch coupler according to an embodiment of the present disclosure.
Figure 7:
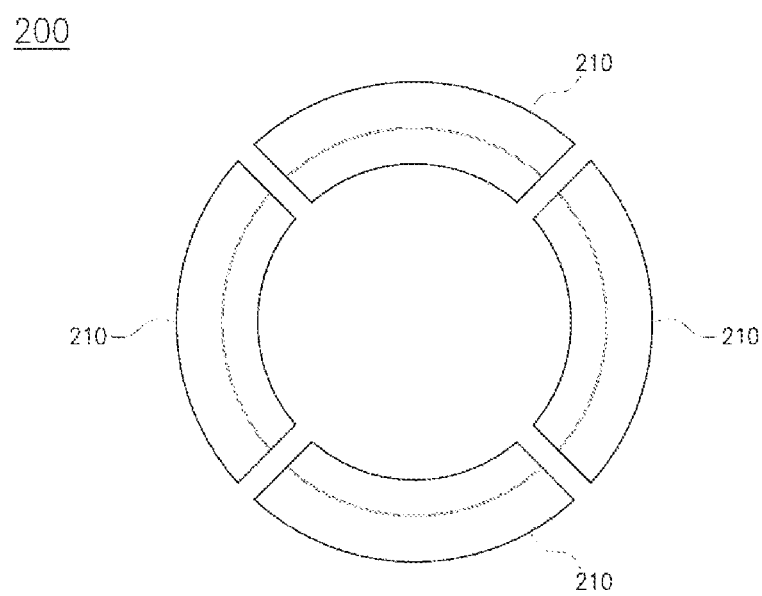
FIG. 7 is a view illustrating a usage state of a piece body unit of the rebar movement-prevention-type one-touch coupler according to an embodiment of the present disclosure.

Referring to FIGS. 5 to 7, the piece body unit 200 is formed of a plurality of piece bodies 210, and is respectively inserted into the pair of housing units 100. With the piece body unit 200 being in a state in which the plurality of piece bodies 210 is arranged to be spaced apart in a circular line, the piece body unit 200 is inserted into and disposed on the inner passage 110 through the socket mounting hole 112 of the housing unit 100. In addition, at an inner side surface of the piece body unit 200, a plurality of locking protrusions 211 is provided in a longitudinal direction, and serves to fix the rebar 10 while being in close contact with an outer circumferential surface of the rebar 10. The locking protrusion 211 is configured such that an inclined protrusion is formed in a direction toward the socket mounting hole 112 at the other side, the direction being opposite to a direction in which the rebar 10 is introduced. Accordingly, when the locking protrusion 211 is in close contact with the rebar 10, the locking protrusion 211 may prevent the slipping situation and may increase a friction force.

In order to securely hold the rebar 10 and to keep a balance, it is preferable that one piece body unit 200 is formed of four piece bodies 210.

Here, at the inner side surface of the piece body 210, a piece body ring insertion groove 212 having a predetermined width (d) in a longitudinal direction may be formed in a circumferential direction. In order for each of the piece bodies 210 to maintain a state in which the piece body ring 500 is fitted and fixed to the each of the piece bodies 210, it is preferable that the predetermined width (d) of the piece body ring insertion groove 212 is configured to be the same as a height (H) of the piece body ring 500.

In addition, each of the piece bodies 210 may be formed of an expanded surface body 210a, a spring seating surface body 210b, and a spring guide surface body 210c.

First, the expanded surface body 210a is configured such that an outer diameter thereof becomes smaller toward the one side thereof from the other side thereof. Such an expanded surface body 210a is disposed such that the expanded surface body 210a is to be in contact with the tapered inner circumferential surface 120 of the housing unit 100. In addition, when the housing unit 100 and the connection socket 400 are coupled to each other, the expanded surface body 210a smoothly moves toward the rebar inlet hole 111 along the tapered inner circumferential surface 120, thereby allowing the locking protrusion 211 to be securely engaged with and fixed to the outer circumferential surface of the rebar 10.

The spring seating surface body 210b is configured to be stepped toward an inner circumferential surface thereof from a second end of the expanded surface body 210a. By such a spring seating surface body 210b, a space into which the spring 300 is capable of being inserted is formed, and the spring 300 inserted into the spring seating surface body 210b through the socket mounting hole 112 pressurizes the spring seating surface body 210b by a coupling of the housing unit 100 and the connection socket 400. By a pressure of the spring 300 acting on the spring seating surface body 210b, the expanded surface body 210a is can be moved toward the rebar inlet hole 111 along the tapered inner circumferential surface 120.

The spring guide surface body 210c is formed at a second end of the spring seating surface body 210b and extends such that an outer diameter thereof is constant. In order to guide the spring 300 to be inserted into the spring seating surface body 210b, it is preferable that the spring guide surface body 210c is configured to be smaller than an inner diameter of the spring 300.

Referring to FIGS. 1 to 4, the spring 300 is respectively disposed at the pair of housing units 100, and is stably inserted into an inner wall surface of the inner passage 110 through the socket mounting hole 112 and is fitted to a second end of the piece body unit 200, thereby serving as providing an elastic force in a longitudinal direction to the piece body unit 200. Such a spring 300 is disposed at the non-tapered inner circumferential surface 130 side of the housing unit 100, and it is preferable that the outer diameter of the spring 300 is configured to be equal to or lower than a diameter of the non-tapered inner circumferential surface 130. In addition, it is preferable that the outer diameter of the spring 300 is configured to be larger than a diameter of the tapered inner circumferential surface 120 and pressurizes the second end of the piece body unit 200 from a domain of the non-tapered inner circumferential surface 130.

Figure 8:
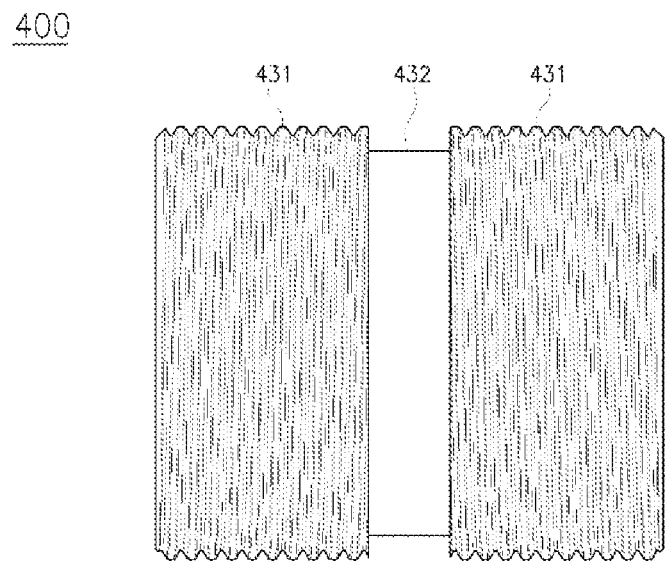
FIG. 8 is an external view illustrating a connection socket of the rebar movement-prevention-type one-touch coupler according to an embodiment of the present disclosure.
Figure 9:
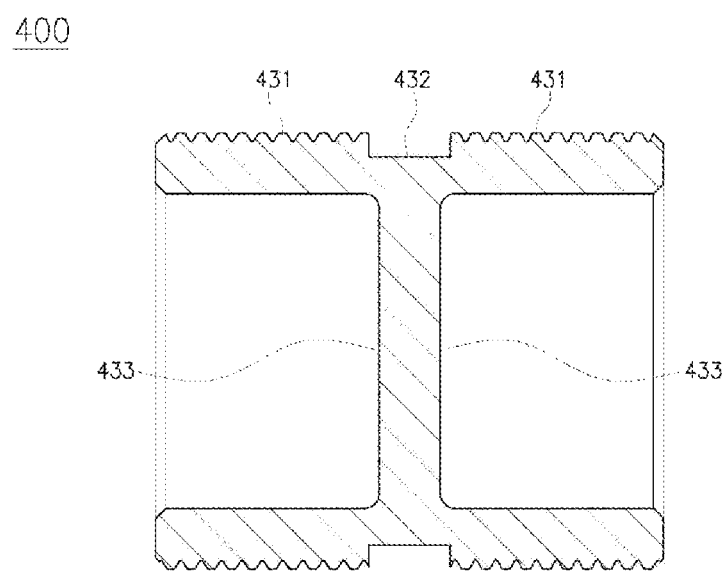
FIG. 9 is an internal cross-sectional view illustrating the connection socket of the rebar movement-prevention-type one-touch coupler according to an embodiment of the present disclosure.

Referring to FIGS. 8 and 9, the connection socket 400 is disposed between the pair of housing units 100, and is formed in a cylindrical shape, thereby being coupled to the pair of housing units 100. In addition, the connection socket 400 is coupled to the non-tapered inner circumferential surface 130 of each of the housing units 100, and connects the pair of housing units 100 to each other. In order for the connection socket 400 to be coupled to the female thread machined surface 131 that is respectively formed at the non-tapered inner circumferential surface 130 of each of the housing units 100, the male thread machined surface 431 is respectively formed at opposite ends of the outer circumferential surface of the connection socket 400. In addition, a non-thread machined surface 432 is recessively formed at a space between the male thread machined surfaces 431 of the connection socket 400, and is positioned at a center of the outer circumferential surface of the housing unit 100. Such a non-thread machined surface 432 allows a worker to identify a coupling length between the pair of housing units 100 and the connection socket 400 when the pair of housing units 100 is coupled to the connection socket 400, so that the coupling length with respect to the rebar 10 is capable of being adjusted and a working progress may be easily checked.

In addition, a rebar seating surface 433 is formed in the connection socket 400 such that an end of the rebar 10 is capable of being seated on the rebar seating surface 433 while the rebar 10 is inserted into an inner portion of the connection socket 400. It is preferable that such a rebar seating surface 433 is centrally disposed so that the rebars 10 are capable of being inserted in the same length to each other. In addition, it is preferable that the inner diameter of the connection socket 400 is configured to be smaller than the inner diameter of the spring 300 and the outer diameter of the connection socket 400 is configured to be larger than the outer diameter of the spring 300 so that the each of the opposite sides of the connection socket 400 stably pressurizes the second end of the spring 300.

Referring to FIGS. 1 to 3, and FIG. 10, the piece body ring 500 is inserted into the piece body ring insertion groove 212, and guides the plurality of piece bodies 210 to be positioned in place on the circular line. In addition, the piece body ring 500 allows the piece bodies 210 inserted into the inner passage 110 of the housing unit 100 to be in close contact with the tapered inner circumferential surface 120. To this end, an initial outer diameter of the piece body ring 500 before performing a tightening operation is configured to be in a size range in which the plurality of piece bodies 210 is in close contact with the tapered inner circumferential surface 120.

In addition, the plurality of piece bodies 210 maintains the same height by the piece body ring 500 that is fitted to the piece body ring insertion groove 212, and is stably inserted into and disposed on the inner wall surface of the inner passage 110 of the housing unit 100. In addition, the piece body ring 500 prevents the plurality of piece bodies 210 from being deviated by a movement of the housing unit 100 while the housing unit 100 is rotated so as to perform a tightening operation to the inserted rebar 10, and guides the piece body unit 200 positioned around the rebar 10 to uniformly and stably tighten the rebar 10.

Figure 10:
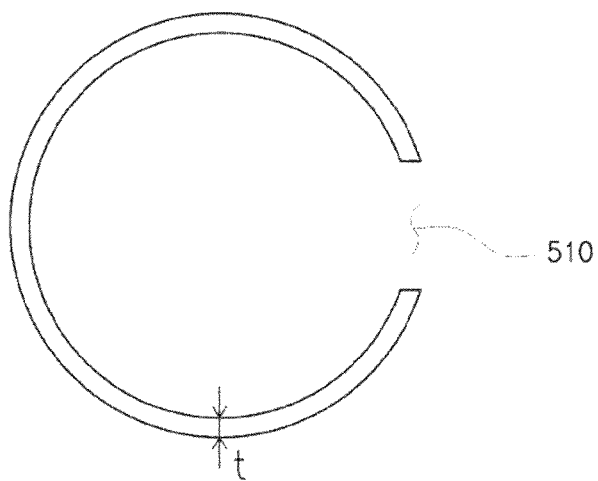
FIG. 10 shows views illustrating a piece body ring of the rebar movement-prevention-type one-touch coupler according to an embodiment of the present disclosure.
Figure 10:

And the piece body ring 500 is formed of an elastic material and formed in a major arc shape that is provided with an incision portion 510 in which a predetermined section is cut, so that the diameter of the piece body ring 500 is capable of being adjusted by the incision portion 510 as the piece body ring 500 moves depending on the rotation movement of the housing unit 100. Such a piece body ring 500 may be formed of a metal material having elasticity or a resin material having elasticity. In addition, the piece body ring 500 is formed in a ring shape that has a rectangular vertical cross-sectional shape, and the height (H) of the piece body ring 500 is greater than twice a thickness (t) of the piece body ring 500, as shown in FIG. 10, and is configured to have the same height of the predetermined width (d) of the piece ring insertion groove 212, thereby allowing the piece body ring 500 to be fitted to the plurality of piece bodies 210. It is preferable that the height (H) of the piece body ring 500 and the predetermined width (d) of the piece ring insertion groove 212 are 3 mm to 15 mm.

Meanwhile, the diameter of the piece body ring 500 is configured to be adjusted by the incision portion 510. In addition, the piece body ring 500 serves as a linkage that allows each of the piece bodies 210 positioned in place forming the piece body unit 200 to be simultaneously moved toward the rebar inlet hole 111.

Referring to FIG. 1, the pair of housing units 100 is operated in an initial setting mode in which the pair of housing units 100 is in a state of being spaced apart from each other by an initial coupling length (L) in which the connection socket 400 is partially coupled to the pair of housing units 100.

In addition, referring to FIG. 2, in a state in which the rebar 10 is inserted into the inner passage 110 through the rebar inlet hole 111, the pair of housing units 100 is further coupled by an additional coupling length (L'), so that the spring 300 and the piece bodies 210 are guided to be moved to the one side direction, thereby the pair of housing units 100 being operated in a rebar fixing mode in which the rebar 10 is fixed without a movement of the rebar 10. The portion up to the non-thread machined surface 432 of the connection socket 400 may be included in the additional coupling length (L'), and an additional coupling operation may be performed by the worker, depending on a working situation. Here, since the one side of the outer circumferential surface of the housing unit 100 is provided with the coupling guide surface 140 having the polygonal shape in the longitudinal direction, a final tightening operation of the housing unit 100 is capable of being performed by using a separate tightening device such as a wrench. Therefore, after the initial setting mode for separately connecting the pair of housing units 100, the rebar fixing mode in which the pair of housing units 100 is double-tightened by the additional tightening operation performed from the worker and the finial tightening operation performed by using the separate tightening device is capable of being performed. Through this, the operational effect of a secure fixation structure without a movement of a rebar may be maximized. The piece body ring 500 having the rectangular vertical cross-sectional shape to which the plurality of piece bodies 210 is fitted is provided in the present disclosure. Therefore, as the plurality of the piece bodies 210 is positioned in place on the circular line, the plurality of piece bodies 210 are capable of being stably and easily inserted inside the housing unit 100 without being separated to the outside, and is disposed inside the housing unit 100 while maintaining the same height, thereby securely fixing the rebar without a misoperation.

Although the rebar movement-prevention-type one-touch coupler according to an embodiment of the present disclosure has been described with reference to the accompanying drawings as described above, this is merely an example, and those skilled in the art will appreciate that various changes and modifications are possible without departing from the technical spirit of the present disclosure.

The invention claimed is:

1. A rebar movement-prevention one-touch coupler comprising:
    a pair of housing units each of which is formed in a tubular shape in which a rebar inlet hole provided at one side thereof and a socket mounting hole provided at the other side thereof are connected with each other via an inner passage, the pair of housing units being configured to have a tapered inner circumferential surface of which an inner diameter becomes smaller to the one side direction;
    a pair of piece body units each of which is provided with a plurality of piece bodies each having an expanded surface body in which an outer circumferential surface thereof becomes smaller to the one side direction and which is disposed to be in contact with the tapered inner circumferential surface, the plurality of piece bodies being inserted into and disposed in the inner passage of each of the housing units while the plurality of piece bodies is in a state of being spaced apart from each other in a circular line, and an inner side surface of each of the plurality of piece bodies being provided with a plurality of locking protrusions in a longitudinal direction thereof; and
    a pair of springs each of which is configured to respectively provide an elastic force in a longitudinal direction thereof to each of the piece body units by being inserted into the inner passage of each of the housing units and by being fitted to an end of each of the piece body units,
    wherein the inner side surface of each of the piece bodies is provided with a piece body ring insertion groove in a circumferential direction, and
    the rebar movement-prevention one-touch coupler further comprises:
    a piece body ring formed of an elastic material and having a major arc shape provided with an incision portion in which a predetermined section is cut and having a rectangular vertical cross-sectional shape with a height greater than twice a thickness of the piece body ring and that is the same as a width in a longitudinal direction of the piece body ring insertion groove, the piece body ring being configured to guide the expanded surface body of each of the piece bodies to be in close contact with the tapered inner circumferential surface and configured to guide the plurality of piece bodies to be positioned in place on the circular line while the plurality of piece bodies is maintaining a position in a longitudinal direction thereof to be the same with each other, and the piece body ring being fitted and fixed to the piece body ring insertion groove such that each of the piece bodies is simultaneously moved in a direction toward the rebar inlet hole, and
    both the width in the longitudinal direction and the height are set to be 3 mm to 15 mm.

2. The rebar movement-prevention one-touch coupler of claim 1, wherein each of the housing units is provided with a non-tapered inner circumferential surface having the same diameter as a diameter of the socket mounting hole, and each of the non-tapered inner circumferential surfaces is connected to each of the socket mounting holes and is provided with a female thread machined surface,
    wherein the rebar movement-prevention one-touch coupler further comprises:
    a connection socket formed in a cylindrical shape and disposed between the pair of housing units, the connection socket being configured to connect the pair of housing units to each other at opposite ends thereof provided with male thread machined surfaces being respectively coupled to the female thread machined surfaces, the connection socket being provided with a non-thread machined surface that is recessively formed between the male thread machined surfaces and is provided on a center between the outer circumferential surfaces of the opposed housing units, the connection socket being configured such that an inner center portion thereof has a rebar seating surface on which an end portion of a rebar is seated while the rebar is inserted into the connection socket, and the connection socket being configured such that opposite side surfaces thereof have inner diameters smaller than an inner diameter of the springs and outer diameters of the opposite side surfaces of the connection socket are larger than an outer diameter of the springs, thereby pressurizing an end of the springs, and the rebar movement-prevention one-touch coupler is configured to be operated in an initial setting mode in which each of the housing units is in a state of being spaced apart from each other by an initial coupling length in which the pair of housing units are partially coupled to the connection socket, and is configured to be operated in a rebar fixing mode in which each of the housing units is coupled to the connection socket up to an additional coupling length while a rebar is in a state of being inserted into the inner passage through the rebar inlet hole, so that the rebar is fixed without a movement of the rebar while each of the springs and each of the piece bodies are guided to be moved to the one side direction.

3. The rebar movement-prevention one-touch coupler of claim 2, wherein the one side of the outer circumferential surface of each of the housing units has a coupling guide surface formed in any one shape selected from a hexagonal shape and an octagonal shape, and an edge of each of the coupling guide surfaces has a safety guide surface formed in a planar shape or a curved shape so that an injury caused by the edges of the coupling guide surfaces is prevented.

* * * * *